US012756001B2

(12) United States Patent
Lu et al.

(10) Patent No.: US 12,756,001 B2
(45) Date of Patent: Oct. 6, 2026

(54) ELECTRODE PLATE DEVIATION CORRECTION METHOD, APPARATUS, DEVICE, STORAGE MEDIUM AND PRODUCT

(71) Applicant: CONTEMPORARY AMPEREX TECHNOLOGY (HONG KONG) LIMITED, Hong Kong (CN)

(72) Inventors: Haoran Lu, Ningde (CN); Shiping Feng, Ningde (CN); Wen Chang, Ningde (CN); Qiuhui Zheng, Ningde (CN); Canbin Chen, Ningde (CN); Qing Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 507 days.

(21) Appl. No.: 18/471,288

(22) Filed: Sep. 20, 2023

(65) Prior Publication Data

US 2024/0030482 A1 Jan. 25, 2024

Related U.S. Application Data

(63) Continuation of application No. PCT/CN2022/071853, filed on Jan. 13, 2022.

(51) Int. Cl.
*H01M 10/04* (2006.01)

(52) U.S. Cl.
CPC ... *H01M 10/0409* (2013.01); *H01M 10/0431* (2013.01)

(58) Field of Classification Search
CPC ...................... H01M 10/0409; H01M 10/0431
See application file for complete search history.

(56) References Cited

U.S. PATENT DOCUMENTS

| | | | |
|---|---|---|---|
| 2006/0123622 A1 | 6/2006 | Guy | |
| 2018/0190963 A1 | 7/2018 | Guo et al. | |
| 2020/0255241 A1* | 8/2020 | Hirahara | B65H 9/166 |

FOREIGN PATENT DOCUMENTS

| | | |
|---|---|---|
| CN | 201629373 U | 11/2010 |
| CN | 102931438 A | 2/2013 |
| CN | 106450477 A | 2/2017 |
| CN | 107394097 A | 11/2017 |
| CN | 207490048 U | 6/2018 |
| CN | 108525958 A | 9/2018 |
| CN | 208352445 U | 1/2019 |

(Continued)

OTHER PUBLICATIONS

CN-214086920-U English machine translation (Year: 2026).*

(Continued)

*Primary Examiner* — Armindo Carvalho, Jr.
(74) *Attorney, Agent, or Firm* — ANOVA LAW GROUP, PLLC

(57) ABSTRACT

An electrode plate deviation correction method includes collecting, by sensors, deviation data of an edge of an electrode plate relative to a preset boundary, determining a deviation correction displacement of the electrode plate according to the deviation data, controlling, according to the deviation correction displacement, an unwinding apparatus for the electrode plate to adjust a position of the electrode plate so that the deviation data of the electrode plate relative to the preset boundary is within a target range.

8 Claims, 2 Drawing Sheets

(56) References Cited

FOREIGN PATENT DOCUMENTS

| | | | |
|---|---|---|---|
| CN | 111416142 | A | 7/2020 |
| CN | 112875379 | A | 6/2021 |
| CN | 113140805 | A | 7/2021 |
| CN | 214086920 | U | 8/2021 |
| CN | 214864886 | U | 11/2021 |
| CN | 112875379 | B | 7/2022 |
| JP | H09120822 | A | 5/1997 |
| JP | 2002265098 | A | 9/2002 |
| JP | 2019169263 | A | 10/2019 |
| JP | 2020128280 | A | 8/2020 |
| WO | 2012159579 | A1 | 11/2012 |

OTHER PUBLICATIONS

CN-207490048-U English machine translation (Year: 2026).*
The European Patent Office (EPO) The Extended European Search Report for Application No. 22919428.7, Apr. 29, 2024 11 Pages.
The Japan Patent Office (JPO) Notice of Reasons for Refusal for Application No. 2023-552313 Oct. 29, 2024 8 Pages (including translation).
The World Intellectual Property Organization (WIPO) International Search Report for PCT/CN2022/071853 Sep. 28, 2022 6 pages (including English translation).
China National Intellectual Property Administration (CNIPA) The First Office Action for Application No. 202280019512.5, May 22, 2026 16 Pages (including translation).

* cited by examiner

ELECTRODE PLATE DEVIATION CORRECTION METHOD, APPARATUS, DEVICE, STORAGE MEDIUM AND PRODUCT

CROSS-REFERENCE TO RELATED APPLICATION

This application is a continuation of International Application No. PCT/CN2022/071853, filed on Jan. 13, 2022, the entire content of which is incorporated herein by reference.

TECHNICAL FIELD

The present application relates to the technical field of battery manufacturing, and in particularly to an electrode plate deviation correction method, apparatus, device, storage medium and product.

BACKGROUND

With the continuous development of science and technology, batteries have been widely used in daily production life. In the process of producing a battery, a wound electrode plate may be unwound to feed the electrode plate to downstream processing equipment of the battery.

However, in the process of unwinding, an electrode plate often deviates easily, and if the delivery position of the electrode plate is not corrected timely, the electrode plate is easily wrinkled and damaged, thus affecting product quality of the battery.

SUMMARY

In view of the problems above, the present application provides an electrode plate deviation correction method, apparatus, device, storage medium and product, so that the problem that an electrode plate deviation cannot be corrected timely, which in turn affects product quality of the battery can be solved.

In a first aspect, the present application provides an electrode plate deviation correction method, including: collecting, by sensors, deviation data of an edge of an electrode plate relative to a preset boundary; determining a deviation correction displacement of the electrode plate according to the deviation data; and controlling, according to the deviation correction displacement, an unwinding apparatus for the electrode plate to adjust a position of the electrode plate so that the deviation data of the electrode plate relative to the preset boundary is within a target range.

In the embodiments of the present application, after collecting, by sensors, deviation data of an edge of an electrode plate relative to a preset boundary, next, corresponding data processing is performed on the deviation data, and a deviation correction displacement of the electrode plate can be determined quickly, so that an unwinding apparatus for the electrode plate can be controlled timely according to the deviation correction displacement to adjust a position of the electrode plate, making the deviation data of the electrode plate relative to the preset boundary is within the target range, thereby avoiding the electrode plate being wrinkled or damaged during delivery.

In some embodiments, a number of the sensors is at least two, and the deviation data includes a plurality of first deviation data items and a plurality of second deviation data items; collecting, by sensors, deviation data of an edge of an electrode plate relative to a preset boundary includes: collecting, by at least one sensor, the plurality of first deviation data items of a first edge of the electrode plate relative to a first preset boundary; collecting, by at least another sensor, a plurality of third deviation data items of a second edge of the electrode plate relative to a second preset boundary, wherein the second edge of the electrode plate includes a tab; and filtering the plurality of third deviation data items according to a width of the tab to obtain the plurality of second deviation data items.

In the embodiments of the present application, acquiring, by at least two sensors, deviation data of edges of an electrode plate respectively can improve accuracy of a deviation correction displacement. Since each sensor can be mounted on a slide rail, a position of a sensor can be adjusted easily according to requirements of different widths of an electrode plate coil, improving convenience. In a case where data collected by a sensor includes a tab, second deviation data is obtained by filtering collected third deviation data based on a width of the tab, thereby improving reliability of data for calculating a deviation correction displacement.

In some embodiments, the filtering the plurality of third deviation data items according to a width of the tab to obtain the plurality of second deviation data items includes: determining a target deviation range according to the width of the tab; and filtering out the third deviation data item within the target deviation range to obtain the plurality of second deviation data items.

In the embodiments of the present application, determining the target deviation range by combining the width of the tab is beneficial to improve the accuracy of data filtering, so as to improve the accuracy of calculating the deviation correction displacement and avoid affecting an electrical performance of a battery assembly.

In some embodiments, the determining a deviation correction displacement of the electrode plate according to the deviation data includes: determining the deviation correction displacement of the electrode plate according to a preset proportion integration differentiation function and the deviation data.

In the embodiments of the present application, the deviation data collected in a collecting period is input into the preset proportion integration differentiation function so as to quickly calculate and obtain the deviation displacement, facilitating to control the movement of the unwinding apparatus and avoid the situation where the electrode plate is wrinkled or damaged.

In a second aspect, the present application provides an electrode plate deviation correction apparatus, including: a collecting module configured to collect, by sensors, deviation data of an edge of an electrode plate relative to a preset boundary; a processing module configured to determine a deviation correction displacement of the electrode plate according to the deviation data; and a control module configured to: control, according to the deviation correction displacement, an unwinding apparatus for the electrode plate to adjust a position of the electrode plate so that the deviation data of the electrode plate relative to the preset boundary is within a target range.

In the embodiments of the present application, after collecting, by sensors, deviation data of an edge of an electrode plate relative to a preset boundary, next, corresponding data processing is performed on the deviation data, and a deviation correction displacement of the electrode plate can be determined quickly, so that an unwinding apparatus for the electrode plate can be controlled timely according to the deviation correction displacement to adjust a position of the electrode plate, making the deviation data of the electrode plate relative to the preset boundary is within the target range, thereby avoiding the electrode plate being wrinkled or damaged during delivery.

In some embodiments, a number of the sensors is at least two, and the deviation data includes a plurality of first deviation data items and a plurality of second deviation data items; the collecting module is further configured to collect, by at least one sensor, the plurality of first deviation data of a first edge of the electrode plate relative to a first preset boundary; the collecting module is further configured to collect, by at least another sensor, a plurality of third deviation data items of a second edge of the electrode plate relative to a second preset boundary, wherein the second edge of the electrode plate includes a tab; and the processing module is further configured to filter the plurality of third deviation data items according to a width of the tab to obtain the plurality of second deviation data items.

In the embodiments of the present application, acquiring, by at least two sensors, deviation data of edges of an electrode plate respectively can improve accuracy of a deviation correction displacement. Since each sensor can be mounted on a slide rail, a position of a sensor can be adjusted easily according to requirements of different widths of an electrode plate coil, improving convenience. In a case where data collected by a sensor includes a tab, second deviation data is obtained by filtering collected third deviation data based on a width of the tab, thereby improving reliability of data for calculating a deviation correction displacement.

In some embodiments, the collecting module is further configured to determine a target deviation range according to the width of the tab; and the collecting module is further configured to filter out the third deviation data item within the target deviation range to obtain the plurality of second deviation data items.

In the embodiments of the present application, determining the target deviation range by combining the width of the tab is beneficial to improve the accuracy of data filtering, so as to improve the accuracy of calculating the deviation correction displacement and avoid affecting an electrical performance of a battery assembly.

In some embodiments, the processing module is further configured to determine the deviation correction displacement of the electrode plate according to a preset proportion integration differentiation function and the deviation data.

In the embodiments of the present application, the deviation data collected in a collecting period is input into the preset proportion integration differentiation function so as to quickly calculate and obtain the deviation displacement, facilitating to control the movement of the unwinding apparatus and avoid the situation where the electrode plate is wrinkled or damaged.

In a third aspect, an embodiment of the present application provides an electrode plate deviation correction device, the electrode plate deviation correction device includes a processor, memory, and programs or instructions stored on the memory and executable on the processor, wherein steps of the method in the first aspect are implemented when the programs or instructions are executed by the processor.

In a fourth aspect, an embodiment of the present application provides a readable storage medium having stored thereon programs or instructions that, when executed by a processor, implement steps of the method in first aspect.

In a fifth aspect, an embodiment of the present application provides a computer program product, wherein instructions in the computer program product, when executed by a processor of an electronic device, cause the electronic device to perform steps of the method in first aspect.

The description above are merely an overview of the technical solutions of the present application, which can be implemented according to the contents of the specification in order to be able to make the technical means of the present application more clearly understood, and for making the above described and other objects, features and advantages of the present application more clearly understood, the detailed description of the present application is set forth below.

BRIEF DESCRIPTION OF THE DRAWINGS

Various other advantages and benefits will become apparent to those with ordinary skill in the art upon reading the following detailed description of some embodiments. The accompanying drawings are only for purposes of illustrating some embodiments and are not to be considered as limiting the present application. Moreover, like reference numerals denote like components throughout the accompanying drawings. In the drawings.

DETAILED DESCRIPTION

Figure 1:
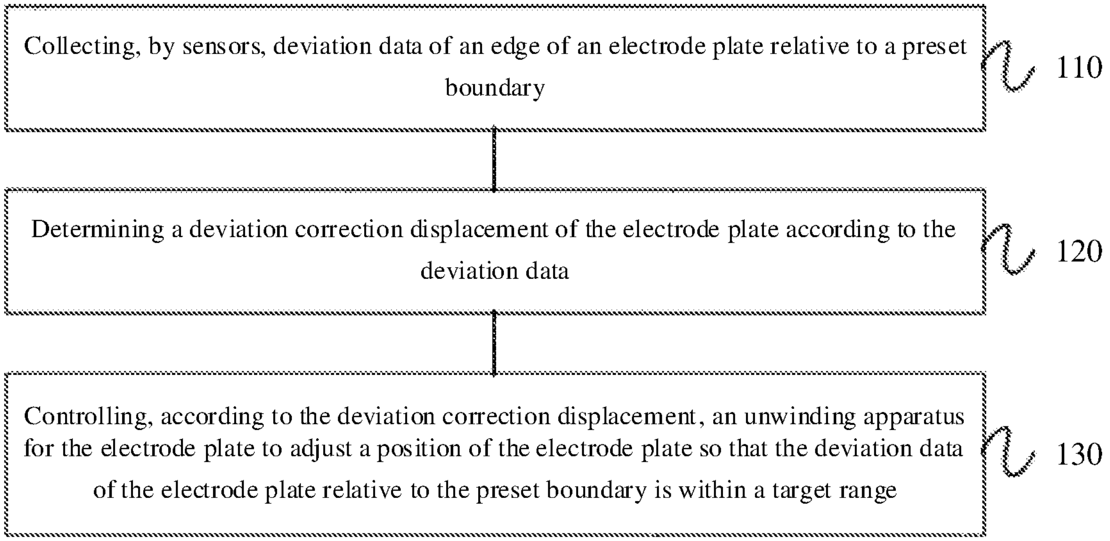
FIG. 1 is a schematic flow diagram of an electrode plate deviation correction method according to an embodiment of the present application.

The embodiments of the technical solutions of the present application will be described in detail below with reference to the drawings. The following embodiments are only used to illustrate the technical solutions of the present application more clearly, therefore are only used as examples, and cannot be used to limit the protection scope of the present application.

Unless otherwise defined, all technical and scientific terms used in the present application have the same meanings as commonly understood by those skilled in the technical field of the present application; the terms used in the present application are only for purposes of description of specific embodiments, and are not intended to limit the present application; the terms "comprising" and "having" in the description and claims of the present application and the above brief description of the drawings and any variations thereof are intended to cover non-exclusive inclusions.

In the description of the embodiments of the present application, the technical terms "first", "second" and the like are only used to distinguish different objects, but should not be understood that they indicate or imply relative importance or imply the number, specific sequence or primary and secondary relationships of the technical features that they refer to. In the description of the embodiments of the present application, "a plurality of" means two or more, unless otherwise explicitly and specifically defined.

"An embodiment" mentioned in the present application means that a particular feature, structure or characteristic described in combination with an embodiment may be included in at least one embodiment of the present application. Appearances of the phrase in various places in the description are not necessarily all referring to the same embodiment, nor a separate or alternative embodiment that is mutually exclusive of other embodiments. It is explicitly and implicitly understood by those skilled in the art that the embodiments described herein may be combined with other embodiments.

In the description of the embodiments of the present application, the term "and/or" is only a kind of association relationship that describes associated objects, which indicates three possible kinds of relationships. For example, A and/or B may indicate the following three cases: A exists alone, A and B exist simultaneously, and B exists alone. In addition, the character "/" herein generally represents that there is an "or" relationship between the associated objects preceding and succeeding the character "/" respectively.

In the description of the embodiments of the present application, the term "a plurality of" refers to two or more (including two), similarly, "a plurality of groups" refers to more than two groups (including two groups), and "a plurality of pieces" refers to two or more pieces (including two pieces).

Currently, with the continuous development of science and technology, batteries have been widely used in daily production life. For example, batteries are applied not only to water power, fire power, wind power, and solar power plants, among other energy storage power systems, but also to electric bicycles, electric motorcycles, electric cars, among other electric vehicles, as well as military equipment and aerospace, among other various fields widely. As the fields of battery applications continue to expand, its market demand continues to increase.

A battery mentioned in the embodiments of the present application refers to a single physical module including one or more battery cells to provide a higher voltage and a higher capacity. For example, the battery mentioned in the present application may include a battery module, a battery pack, or the like. A battery typically includes a box body for enclosing one or more battery cells. The box body can prevent liquids or other foreign objects from affecting the charging or discharging of the battery cells.

In the present application, a battery cell may include a lithium ion secondary battery cell, a lithium ion primary battery cell, a lithium sulfur battery cell, a sodium lithium ion battery cell, a sodium ion battery cell, a magnesium ion battery cell, or the like, which is not limited in the embodiments of the present application. The battery cell may be in the shape of a cylinder, a flat body, a cuboid, or other shapes, which is not limited in the embodiments of the present application.

A battery cell includes an electrode assembly and electrolyte, and the electrode assembly includes a positive electrode plate, a negative electrode plate and a separator. The electrode assembly includes, for example, a wound electrode assembly, and a laminated electrode assembly, etc.

For example, in the process of forming a wound electrode assembly, an electrode plate coil includes a coil of a positive electrode plate and a coil of a negative electrode plate, wherein the coil of the positive electrode plate and the coil of the negative electrode plate need to be aligned with each other and wound to form the electrode assembly. If the positive electrode plate and the negative electrode plate are not aligned with each other, not only the appearance but also the quality of the wound electrode assembly is affected. As another example, in the process of forming a laminated electrode assembly, an electrode plate coil needs to be cut into individual unitary pieces for laminating together to form the laminate, however, since the electrode plate coil needs to be unwound and then enter a cutting mechanism for cutting and forming, and in the process of unwinding the electrode plate coil, deviation phenomenons may occur, which makes it difficult to ensure the accuracy of the electrode plate after being cut by the cutting mechanism, thereby affecting quality of a subsequent finished laminated lithium battery.

The inventors have noticed that, in the process of unwinding the electrode plate coil, an electrode plate often deviates easily, and if the delivery position of the electrode plate is not corrected timely, the electrode plate is easily wrinkled and damaged, thus affecting product quality of the battery.

In order to be able to correct the electrode plate deviation timely and thus avoid affecting battery quality, an embodiment of the present application proposes an electrode plate deviation correction method, wherein after collecting, by sensors, deviation data of an edge of an electrode plate relative to a preset boundary, next, corresponding data processing is performed on the deviation data, and a deviation correction displacement of the electrode plate can be determined quickly, so that an unwinding apparatus for the electrode plate can be controlled timely according to the deviation correction displacement to adjust a position of the electrode plate, making the deviation data of the electrode plate relative to the preset boundary is within the target range, thereby avoiding the electrode plate being wrinkled or damaged during delivery.

The electrode plate deviation correction method according to the embodiments of the present application will be described in detail below with reference to the accompanying drawings through specific embodiments and application scenarios thereof.

With reference to FIG. 1, the embodiments of the present application provide a schematic flow diagram of an electrode plate deviation correction method. As shown in FIG. 1, the method may include the following steps 110 to 130.

At step 110, deviation data of an edge of an electrode plate relative to a preset boundary is collected by one or more sensors.

At step 120, a deviation correction displacement of the electrode plate is determined according to the deviation data.

At step 130, an unwinding apparatus for the electrode plate is controlled according to the deviation correction displacement to adjust a position of the electrode plate so that the deviation data of the electrode plate relative to the preset boundary is within a target range.

In the step 110 above, an electrode assembly is an important component in a battery cell. The electrode assembly may include an electrode plate, a separator, etc. Specifically, the electrode plate may include a positive electrode plate and a negative electrode plate, and the separator is an insulator arranged between the positive electrode plate and the negative electrode plate.

In the process of forming a battery assembly, an electrode plate coil is typically present in a wound manner. For example, an electrode plate coil may be uncoiled and unwound by an unwinding apparatus to feed the electrode plate to a downstream processing device. The unwinding apparatus may be an integral part or independent of the battery processing device. The unwinding apparatus may include a roller on which the electrode plate coil can be mounted, by controlling the rotation of the roller, the unwinding of the electrode plate coil is implemented and the electrode plate coil is fed to the downstream battery processing device. The battery processing device may be, for example, a winding apparatus for forming a wound electrode assembly, and the battery processing device may also be, for example, a cutting apparatus for forming a laminated battery, which is not specifically limited herein.

In some embodiments, a number of the sensors may be one or more, the sensors may be located at the edge of the electrode plate coil, and the sensors may detect deviation data of the edge of the coil in the process of delivery of the electrode plate coil. The sensors may be mounted on a slide rail, and the sensors may move on the slide rail. Exemplarily, a moving direction of the sensors may be perpendicular to the delivery direction of the electrode plate coil. Thus, for requirements of widths of different electrode plates of different battery assemblies, positions of the sensors can be adaptively adjusted to adapt to electrode plate coils of various different specifications.

As a specific example, the sensors may be, for example, an optical fiber sensor, by which a rapid detection of the position of the edge of the electrode plate coil can be achieved. Specifically, the sensors can collect multiple times in a preset period to obtain the collected data of the positions where a plurality of edges of the electrode plate coil are located, so that the deviation data of the electrode plate coil in the process of delivery can be determined. Exemplarily, the collecting period of the sensors may be, for example, 2 ms.

In the process of collecting the data by the sensors, each collection can obtain the position where the edge of the electrode plate coil is located. In the embodiments of the present application, the preset boundary can be, for example, a position of the edge of the electrode plate collected for the first time in a data collecting period, and as another example, the preset boundary can also be a preset reference edge in the unwinding apparatus, and as yet another example, the preset boundary can also be a position where the edge of the electrode plate coil collected last time is located, etc., and the preset boundary can be specifically set according to actual usage requirements, which is not specifically limited herein.

In the step 120 above, a number of deviation data items may be one or more. For example, the sensors collect data multiple times in a preset period, and each collection can obtain the position where the edge of the electrode plate coil is located. Taking the preset boundary being the position of the edge of the electrode plate collected for the first time in a data collecting period as an example, in a data collecting period, according to the position of the edge of the electrode plate collected for the first time and the position of the edge of the electrode plate collected in real time, the deviation data of the electrode plate coil can be determined; taking the preset boundary being the position where the edge of the electrode plate coil collected last time is located as an example, for two adjacent data collection, the deviation data of the electrode plate coil can be determined.

In the embodiments of the present application, after obtaining the deviation data, data calculation can be performed according to a preset algorithm, so as to obtain a deviation correction displacement. The preset algorithm can be specifically set according to the data amount of deviation data and the actual usage requirements in a specific application.

The deviation correction displacement may specifically include a distance in the direction in which the electrode plate coil needs to be moved, e.g. the electrode plate coil may be moved in a first direction or a second direction perpendicular to the delivery of the coil, and the first direction and the second direction are opposite.

After the deviation correction displacement is obtained, step 130 may be performed according to the embodiments of the present application.

At step 130, an unwinding apparatus for the electrode plate is controlled, according to the deviation correction displacement, to adjust a position of the electrode plate so that the deviation data of the electrode plate relative to the preset boundary is within a target range.

In the step 130 above, the unwinding apparatus for the electrode plate may move according to the deviation correction displacement, so as to adjust the position of the electrode plate. As an example, the unwinding apparatus may be connected with a slipway module including a sliding rail, and the unwinding apparatus may move along the sliding rail. In this way, the unwinding apparatus can be controlled according to the deviation correction displacement so as to adjust the position of the electrode plate.

In an embodiment of the present application, after collecting, by sensors, deviation data of an edge of an electrode plate relative to a preset boundary, next, corresponding data processing is performed on the deviation data, and a deviation correction displacement of the electrode plate can be determined quickly, so that an unwinding apparatus for the electrode plate can be controlled timely according to the deviation correction displacement to adjust a position of the electrode plate, making the deviation data of the electrode plate relative to the preset boundary is within the target range, thereby avoiding the electrode plate being wrinkled or damaged during delivery.

In some embodiments of the present application, a number of the sensors is at least two, and the deviation data includes a plurality of first deviation data items and a plurality of second deviation data items; the step 120 above may include: collecting, by at least one sensor, the plurality of first deviation data items of a first edge of the electrode plate relative to a first preset boundary; and collecting, by at least another sensor, a plurality of third deviation data items of a second edge of the electrode plate relative to a second preset boundary, wherein the second edge of the electrode plate includes a tab; and filtering the plurality of third deviation data items according to a width of the tab to obtain the plurality of second deviation data items.

Specifically, in a case where the number of the sensors is at least two, at least one sensor may be arranged on each side of the electrode plate coil. In the case where the number of the sensors is two, the two sensors may be mounted on the same sliding rail, or may be respectively mounted on different sliding rails. In a specific application, according to the requirements of the width of the electrode plate coil for the battery assembly, the positions of the two sensors can be determined respectively, so as to easily adapt to electrode plate coils of various specifications.

In an embodiment of the present application, there are at least two sensors correspondingly, and the deviation data may include a plurality of first deviation data items and a plurality of second deviation data items. Exemplarily, a first edge of the electrode plate coil is a flat edge and a second edge typically includes a tab. The plurality of first deviation data items of a first edge of the electrode plate relative to a first preset boundary is collected by at least one sensor; and a plurality of third deviation data items of a second edge of the electrode plate relative to a second preset boundary is collected by at least another sensor.

In some embodiments, the first preset boundary can be, for example, a position of the first edge of the electrode plate collected for the first time in a data collecting period, and as another example, the first preset boundary can also be a preset reference edge in the unwinding apparatus, and as yet another example, the preset boundary can also be a position where the edge of the electrode plate coil collected last time is located, etc., and the first preset boundary can be specifically set according to actual usage requirements, which is not specifically limited herein. The second preset boundary can be, for example, a position of the second edge of the electrode plate collected for the first time in a data collecting period, and as another example, the second preset boundary can also be a preset reference edge in the unwinding apparatus, and as yet another example, the preset boundary can also be a position where the edge of the electrode plate coil collected last time is located, etc., and the second preset boundary can be specifically set according to actual usage requirements, which is not specifically limited herein.

Specifically, in a case where data collected by a sensor includes a tab, according to a width of the tab, a filtering condition is set, to filter the third deviation data, to obtain the second deviation data for calculating the deviation correction displacement.

According to an embodiment of the present application, acquiring, by at least two sensors, deviation data of edges of an electrode plate respectively can improve accuracy of a deviation correction displacement. Since each sensor can be mounted on a slide rail, a position of a sensor can be adjusted easily according to requirements of different widths of an electrode plate coil, improving convenience. In a case where data collected by a sensor includes a tab, second deviation data is obtained by filtering collected third deviation data based on a width of the tab, thereby improving reliability of data for calculating a deviation correction displacement.

In an embodiment of the present application, the filtering the plurality of third deviation data items according to a width of the tab to obtain the plurality of second deviation data items includes: determining a target deviation range according to the width of the tab; and filtering out the third deviation data item within the target deviation range to obtain the plurality of second deviation data items.

Specifically, the target deviation range is a reasonable deviation range for the electrode plate in the process of delivery. The target deviation range may be used as a filtering condition, and under a condition that the third deviation data exceeds the target deviation range, it may be considered that this is caused by a tab, and thus the third deviation data may be filtered according to the target deviation range.

Figure 2:
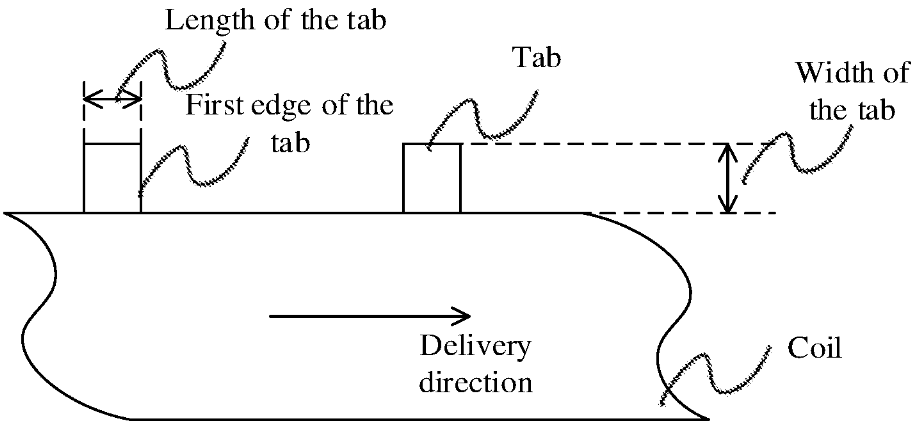
FIG. 2 is a schematic diagram of an electrode plate coil according to an embodiment of the present application.

FIG. 2 is a schematic diagram of an electrode plate coil according to an embodiment of the present application. Since there is a tab, in a case where data collected by a sensor includes the tab, the collected third deviation data may have a mutation, and in order to avoid the mutation data affecting the accuracy of the deviation correction data, a filtering condition is set according to the width of the tab. For example, the filtering condition may be if a value of the third deviation data is within the target deviation range, the third deviation data may be removed, wherein the target deviation range may be, for example, a width of the tab ±1 mm. After completion of filtering the collected third deviation data by the filtering condition, the second deviation data can be obtained for the calculation of the deviation correction displacement.

According to the embodiments of the present application, determining the target deviation range by combining the width of the tab is beneficial to improve the accuracy of data filtering, so as to improve the accuracy of calculating the deviation correction displacement and avoid affecting an electrical performance of a battery assembly.

As another specific embodiment, in the process of collecting the third deviation data, when a difference between the currently detected third deviation data and the third deviation data collected at a previous collecting moment exceeds the target deviation range, the currently detected third deviation data may be determined to be a first edge of the tab, and the first edge of the tab may refer to that shown in FIG. 2. Next, the third deviation data collected within the length of the tab may also be filtered out according to the length of the tab. Exemplarily, the time required for the tab to pass through the sensors may be determined according to the delivery speed of the electrode plate, the third deviation data collected by the sensors within the time range may be removed, and the remaining third deviation data may be determined as the second deviation data for calculating the deviation correction displacement. In this way, the accuracy of data filtering can be improved without adjusting the collecting frequency of the sensors, and stable output of the collected data can be ensured.

In some embodiments of the present application, calculating the deviation correction displacement may be according to the following step: determining the deviation correction displacement of the electrode plate according to a preset proportion integration differentiation function and the deviation data.

Exemplarily, the preset proportion integration differentiation function may, for example, refer to formula (1).

$$x = Ke(t) + \frac{1}{T_t}\int_{t0}^{t1} e(t)\,dt + T_D\frac{de(t)}{dt} \tag{1}$$

wherein x is a deviation correction displacement; e(t) is deviation data collected at time t;

$$\int_{t0}^{t1} e(t)dt$$

is a time integral part of e(t);

$$\frac{de(t)}{dt}$$

is a time differential part of e(t), t0-t1 is a collecting period; K is a proportional coefficient and Tt is an integral time constant; TD is a differential time constant.

Specifically, in combination with a closed-loop adjustment function of the preset proportion integration differentiation function, the deviation correction displacement can be output according to the deviation data of the electrode plate coil. Calculation parameters in the preset proportion integration differentiation function can be set according to data such as the delivery speed of the electrode plate coil and the width of the electrode plate coil in actual applications.

In the embodiments of the present application, the deviation data collected in a collecting period is input into the preset proportion integration differentiation function so as to quickly calculate and obtain the deviation displacement, facilitating to control the movement of the unwinding apparatus and avoid the situation where the electrode plate is wrinkled or damaged.

Figure 3:
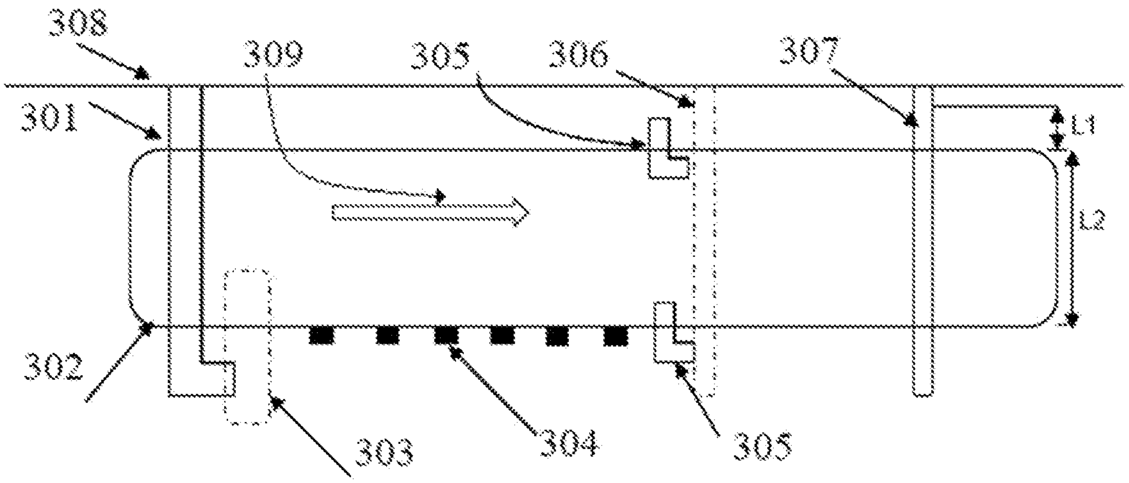
FIG. 3 is a schematic diagram of an electrode plate deviation correction system according to an embodiment of the present disclosure.

In order to better understand the electrode plate deviation correction method according to the embodiments of the present application, embodiments of the above-mentioned electrode plate deviation correction method in actual applications are provided for description herein. FIG. 3 is a schematic diagram of an electrode plate deviation correction system according to an embodiment of the present application, with reference to FIG. 3, the electrode plate deviation correction system includes an electrode plate coil roll 301, an electrode plate coil 302, a slipway module 303, a tab 304, sensors 305, a sliding rail 306, a pass-over roll 307, a bottom plate 308, a delivery direction 309 of the electrode plate coil, the electrode plate coil is delivered substantially along a horizontal plane. L1 is a distance of the first edge from the bottom plate 308 in the horizontal direction and L2 is a width of the electrode plate coil. The coil roll 301, the sliding rail 306 and the pass-over roll 307 may be mounted on the bottom plate 308. The electrode plate coil can be placed on the coil roll 301, the coil roll 301 is also connected with the slipway module 303, and the coil roll 301 can be controlled based on the slipway module 303 to move in a direction perpendicular to the delivery direction 309 of the electrode plate coil. With continued reference to FIG. 3, the two sensors 305 may be fiber optic sensors or may be any other types of sensors capable of detecting the distance between the edge of the coil and the edge of the bottom plate in the horizontal direction, and the types of the sensors are not limited herein. The two sensors 305 may be mounted to the sliding rail 306, and the positions of the two sensors 305 may be adaptively adjusted according to the width of the electrode plate coil. The electrode plate coil may be fed to the battery processing device based on the pass-over roll 307.

After the placement of the electrode plate coil is completed, the coil roll 301 can be controlled to rotate so as to realize the uncoiling and unwinding of the electrode plate coil, and the two sensors 305 are respectively controlled to perform real-time data collecting according to an collecting period so as to obtain first deviation data and third deviation data. In the case where the third deviation data is the data collected on the second edge, since the second edge includes the tab 304, in order to obtain effective deviation data, the third deviation data may be filtered based on the target deviation range determined by the width of the tab, thereby obtaining the second deviation data. After obtaining the first deviation data and the second deviation data, the deviation correction displacement can be obtained by calculating according to the preset proportion integration differentiation function. Next, the coil roll 301 can be moved by the slipway module 303 according to the deviation correction displacement so as to realize the deviation correction of the deviated electrode plate coil at the beginning. In an embodiment of the present application, the electrode plate coil can be effectively controlled to be delivered within a suitable range by correcting the electrode plate coil deviation. Exemplarily, the bottom plate 308 may serve as a datum surface and the distance L1 of the first edge of the electrode plate from the edge of the bottom plate in the horizontal direction may be maintained within a suitable range by correcting the electrode plate coil deviation.

The electrode plate deviation correction apparatus according to the embodiments of the present application will be described in detail below with reference to the accompanying drawings.

Figure 4:
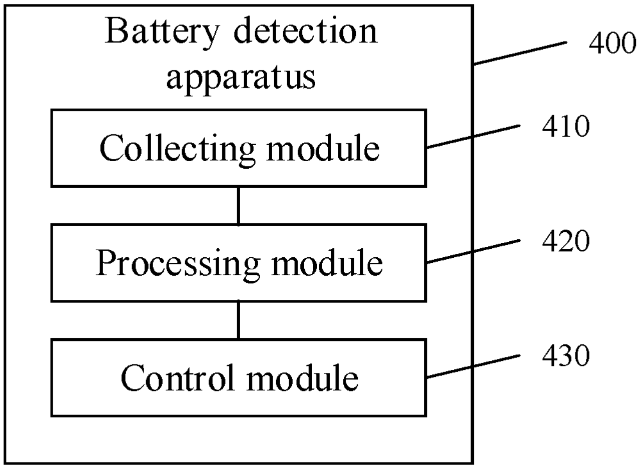
FIG. 4 is a schematic structural diagram of an electrode plate deviation correction apparatus according to an embodiment of the present application.

FIG. 4 is a schematic structural diagram of an electrode plate deviation correction apparatus according to an embodiment of the present application. As shown in FIG. 4, the electrode plate deviation correction apparatus 400 includes a collecting module 410, a processing module 420, and a control module 430.

The collecting module 410 is configured to collect, by sensors, deviation data of an edge of an electrode plate relative to a preset boundary.

The processing module 420 is configured to determine a deviation correction displacement of the electrode plate according to the deviation data.

The control module 430 is configured to: control, according to the deviation correction displacement, an unwinding apparatus for the electrode plate to adjust a position of the electrode plate so that the deviation data of the electrode plate relative to the preset boundary is within a target range.

According to an embodiment of the present application, after collecting, by sensors, deviation data of an edge of an electrode plate relative to a preset boundary, next, corresponding data processing is performed on the deviation data, and a deviation correction displacement of the electrode plate can be determined quickly, so that an unwinding apparatus for the electrode plate can be controlled timely according to the deviation correction displacement to adjust a position of the electrode plate, making the deviation data of the electrode plate relative to the preset boundary is within the target range, thereby avoiding the electrode plate being wrinkled or damaged during delivery.

In some embodiments, a number of the sensors is at least two, and the deviation data includes a plurality of first deviation data items and a plurality of second deviation data items; the collecting module 410 is further configured to collect, by at least one sensor, the plurality of first deviation data items of a first edge of the electrode plate relative to a first preset boundary; the collecting module 410 is further configured to collect, by at least another sensor, a plurality of third deviation data items of a second edge of the electrode plate relative to a second preset boundary, wherein the second edge of the electrode plate includes a tab; the processing module 420 is further configured to filter the plurality of third deviation data items according to a width of the tab to obtain the plurality of second deviation data items.

According to an embodiment of the present application, acquiring, by at least two sensors, deviation data of edges of an electrode plate respectively can improve accuracy of a deviation correction displacement. Since each sensor can be mounted on a slide rail, a position of a sensor can be adjusted easily according to requirements of different widths of an electrode plate coil, improving convenience. In a case where data collected by a sensor includes a tab, second deviation data is obtained by filtering collected third deviation data based on a width of the tab, thereby improving reliability of data for calculating a deviation correction displacement.

In some embodiments, the collecting module 410 is further configured to determine a target deviation range according to the width of the tab; the collecting module 410 is further configured to filter out the third deviation data item within the target deviation range to obtain the plurality of second deviation data items.

According to the embodiments of the present application, determining the target deviation range by combining the width of the tab is beneficial to improve the accuracy of data filtering, so as to improve the accuracy of calculating the deviation correction displacement and avoid affecting an electrical performance of a battery assembly.

In some embodiments, the processing module 420 is further configured to determine the deviation correction displacement of the electrode plate according to a preset proportion integration differentiation function and the deviation data.

In the embodiments of the present application, the deviation data collected in a collecting period is input into the preset proportion integration differentiation function so as to quickly calculate and obtain the deviation displacement, facilitating to control the movement of the unwinding apparatus and avoid the situation where the electrode plate is wrinkled or damaged.

Further details of the electrode plate deviation correction apparatus according to the embodiments of the present application are similar to the electrode plate deviation correction method described above in connection with the examples shown in FIGS. 1 to 3, and can achieve the corresponding technical effects, and thus are not repeated herein for the brevity of the description.

Figure 5:
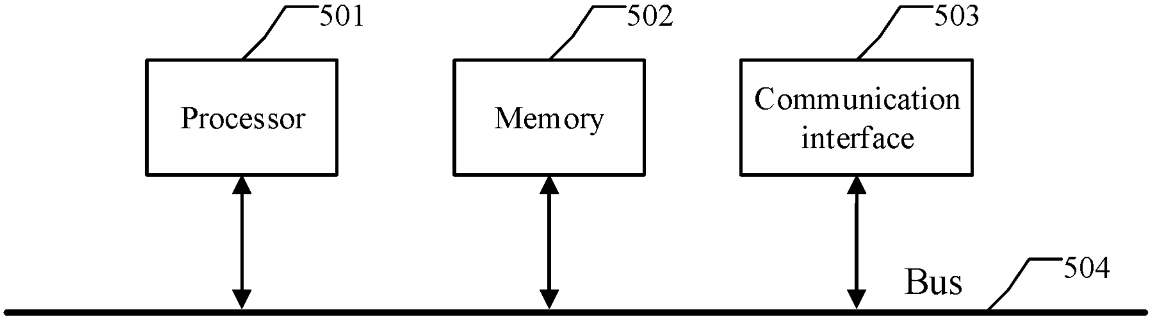
FIG. 5 is a schematic structural diagram of hardware of an electrode plate deviation correction device according to an embodiment of the present application.

FIG. 5 shows a schematic structural diagram of hardware of an electrode plate deviation correction device according to an embodiment of the present application.

The electrode plate deviation correction device may include a processor 501 and a memory 502 storing computer program instructions.

Specifically, the processor 501 above may include a central processing unit (CPU), or an application specific integrated circuit (ASIC), or one or more integrated circuit (s) configured to implement the embodiments of the present application.

The memory 502 may include mass memory for data or instructions. As an example but not as a limitation, the memory 502 may include a hard disk drive (HDD), a floppy disk drive, a flash memory, an optical disk, a magneto-optical disk, a magnetic tape, or a universal serial bus (USB) drive or combination of two or more of these. In some instances, the memory 502 may include removable or non-removable (or fixed) media, or the memory 502 may be a non-volatile solid state memory. In some embodiments, the memory 502 may be internal or external to the battery apparatus.

In some instances, the memory 502 may be a read-only memory (ROM). In an instance, the ROM can be a mask programmed ROM, a programmable ROM (PROM), an erasable PROM (EPROM), an electrically erasable PROM (EEPROM), an electrically alterable ROM (EAROM), or a flash memory, or a combination of two or more of these.

The memory 502 may include a read only memory (ROM), a random access memory (RAM), a magnetic disk storage media device, an optical storage media device, a flash memory device, an electrical, optical or other physical/tangible memory storage device. As a result, generally, the memory includes one or more tangible (non-transitory) computer-readable storage media (for example, memory devices) encoded with software including computer-executable instructions, and when the software is executed (for example, by one or more processors), the software is operable to perform the operations described with reference to methods according to one aspect of the present disclosure.

The processor 501, by reading and executing computer program instructions stored in the memory 502, implements the methods in the embodiments shown in FIGS. 1-3 and achieves the corresponding technical effects achieved by the instances shown in FIGS. 1-3 when performing the methods/steps thereof, which are not repeated herein for brevity.

In one example, the electrode plate deviation correction device may also include a communication interface 503 and a bus 504. As shown in FIG. 5, the processor 501, the memory 502, and the communication interface 503 are connected through the bus 504 and achieve mutual communication.

The communication interface 503 is mainly configured to achieve communication between various modules, apparatuses, units and/or devices in the embodiments of the present application.

The bus 504 includes hardware, software, or both, that couples the components of an online data traffic charging device to each other. As an example rather than limitation, the bus may include an Accelerated Graphics Port (AGP) or other graphics buses, an Extended Industry Standard Architecture (EISA) bus, a Front Side Bus (FSB), a Hyper Transport (HT) interconnect, an Industry Standard Architecture (ISA) bus, a wireless band interconnect, a Low Pin Count (LPC) bus, a memory bus, a Micro Channel Architecture (MCA) bus, a Peripheral Component Interconnect (PCI) bus, a PCI-Express (PCI-X) bus, a Serial Advanced Technology Attachment (SATA) bus, a Video Electronics Standards Association Local Bus (VLB) bus or other suitable buses or a combination of two or more of these. When appropriate, the bus 504 may include one or more buses. Although the embodiments of the present application describe and illustrate a particular bus, any suitable bus or interconnect may be considered in the present application.

The roller press may perform the electrode plate deviation correction method in the embodiments of the present application, thereby implementing the electrode plate deviation correction method and apparatus described in conjunction with FIGS. 1-3.

In addition, in conjunction with the electrode plate deviation correction method and device in the embodiments above, the embodiments of the present application may provide a readable storage medium for implementation. Computer program instructions are stored on the readable storage medium; the computer program instructions, when are executed by a processor, implement any one of the electrode plate deviation correction methods in the embodiments above.

In addition, in conjunction with the electrode plate deviation correction method, apparatus, and readable storage medium in the embodiments above, the embodiments of the present application may provide a computer program product for implementation. Instructions in the computer program product, when executed by a processor of an electronic device, cause the electronic device to perform any of the electrode plate deviation correction methods in the embodiments above.

It should be noted that, the present application is not limited to the specific configuration and processing described above and shown in the figures. For the sake of brevity, a detailed description of known methods is omitted herein. In the above embodiments, several specific steps are described and shown as examples. However, the method process of the present application is not limited to the specific steps described and shown, and those skilled in the art can make various changes, modifications and additions, or change the sequence of steps after comprehending the gist of the present application.

The functional blocks shown in the structural block diagram above may be implemented as hardware, software, firmware, or a combination thereof. When implemented as hardware, it can be, for example, an electronic circuit, an application specific integrated circuit (ASIC), suitable firmware, a plug-in, a functional card, and the like. When implemented as software, elements of the present application are programs or code segments used to perform required tasks. The programs or code segments can be stored in a machine-readable medium, or transmitted on a transmission medium or a communication link through a data signal carried in a carrier wave. A "machine-readable medium" can include any medium that can store or transmit information. An example of the machine-readable medium includes an electronic circuit, a semiconductor memory device, a ROM, a flash memory, an erasable ROM (EROM), a floppy disk, a CD-ROM, an optical disk, a hard disk, a fiber optic medium, a radio frequency (RF) link, and the like. The code segments can be downloaded via a computer network such as the Internet, intranet, and the like.

It should also be noted that, according to the exemplary embodiments described in the present application, some methods or systems are described based on a series of steps or apparatuses. However, the present application is not limited to the above order of the steps, that is, the steps can be performed in the order described in the embodiments or in orders different from that in the embodiments, or several steps can be performed at the same time.

Aspects of the present disclosure are described above with reference to flowchart illustrations and/or block diagrams of methods, apparatuses, devices and computer program products according to the embodiments of the present application. It should be understood that each block of the flowchart illustrations and/or the block diagrams, and a combination of various blocks of the flowchart illustrations and/or the block diagrams can be implemented by the computer program instructions. These computer program instructions can be provided to a processor of a general purpose computer, a special purpose computer, or other programmable data processing apparatuses to produce a machine such that execution of the instructions via the processor of the computer or other programmable data processing apparatuses enables the implementation of the functions/actions specified in one or more blocks of the flowchart illustrations and/or block diagrams. Such processor can be but is not limited to a general purpose processor, a special purpose processor, an application specific processor, or a field programmable logic circuit. It should also be understood that each block of the block diagrams and/or the flowchart illustrations, and the combination of blocks of the block diagrams and/or the flowchart illustrations can also be implemented by special purpose hardware that performs specified functions or actions, or by a combination of the special purpose hardware and computer instructions.

Finally it should be noted that: the embodiments above are only for illustrating technical solutions of the present application, rather than for limiting; although the present application has been described in detail with reference to the foregoing embodiments, those of ordinary skill in the art should understand: it is still possible to modify the technical solutions recited in the foregoing embodiments, or perform equivalent replacements to some or all of the technical features thereof; however, these modifications or replacements do not make an essence of the corresponding technical solutions deviate from the scope of the technical solutions of the embodiments of the present application, which should be encompassed in the scope of the claims and description of the present application. In particular, various technical features described in various embodiments can be combined in any manner as long as there is no structural conflict. The present application is not limited to the specific embodiments described herein, and includes all technical solutions that fall within the scope of the claims.

What is claimed is:

1. An electrode plate deviation correction method, comprising:

collecting, by sensors, deviation data of an edge of an electrode plate relative to a preset boundary;

determining a deviation correction displacement of the electrode plate according to the deviation data; and controlling, according to the deviation correction displacement, an unwinding apparatus for the electrode plate to adjust a position of the electrode plate so that the deviation data of the electrode plate relative to the preset boundary is within a target range;

wherein:

a number of the sensors is at least two, and the deviation data comprises a plurality of first deviation data items and a plurality of second deviation data items; and collecting, by the sensors, the deviation data of the edge of the electrode plate relative to the preset boundary comprises:

collecting, by at least one sensor, the plurality of first deviation data items of a first edge of the electrode plate relative to a first preset boundary;

collecting, by at least another sensor, a plurality of third deviation data items of a second edge of the electrode plate relative to a second preset boundary, wherein the second edge of the electrode plate comprises a tab; and filtering the plurality of third deviation data items according to a width of the tab to obtain the plurality of second deviation data items.

2. The method of claim 1, wherein filtering the plurality of third deviation data items according to the width of the tab to obtain the plurality of second deviation data items comprises:

determining a target deviation range according to the width of the tab; and filtering out the third deviation data item within the target deviation range to obtain the plurality of second deviation data items.

3. The method of claim 1, wherein determining the deviation correction displacement of the electrode plate according to the deviation data comprises:

determining the deviation correction displacement of the electrode plate according to a preset proportion integration differentiation function and the deviation data.

4. An electrode plate deviation correction device, comprising:

a memory storing computer program instructions; and a processor configured to read and execute the computer program instructions to implement the method of claim 1.

5. A computer-readable storage medium having stored thereon computer program instructions that, when executed by a processor, implement the method according to claim 1.

6. An electrode plate deviation correction apparatus, comprising:

a collecting module configured to collect, by sensors, deviation data of an edge of an electrode plate relative to a preset boundary;

a processing module configured to determine a deviation correction displacement of the electrode plate according to the deviation data; and a control module configured to control, according to the deviation correction displacement, an unwinding apparatus for the electrode plate to adjust a position of the electrode plate so that the deviation data of the electrode plate relative to the preset boundary is within a target range;

wherein:

a number of the sensors is at least two, and the deviation data comprises a plurality of first deviation data items and a plurality of second deviation data items;

the collecting module is further configured to:

collect, by at least one sensor, the plurality of first deviation data items of a first edge of the electrode plate relative to a first preset boundary; and collect, by at least another sensor, a plurality of third deviation data items of a second edge of the electrode plate relative to a second preset boundary, the second edge of the electrode plate comprising a tab; and the processing module is further configured to filter the plurality of third deviation data items according to a width of the tab to obtain the plurality of second deviation data items.

7. The apparatus of claim 6, wherein:

the collecting module is further configured to determine a target deviation range according to the width of the tab; and the collecting module is further configured to filter out the third deviation data item within the target deviation range to obtain the plurality of second deviation data items.

8. The apparatus of claim 6, wherein:

the processing module is further configured to determine the deviation correction displacement of the electrode plate according to a preset proportion integration differentiation function and the deviation data.

* * * * *